United States Patent [19]

Hsu

[11] Patent Number: 4,692,865

[45] Date of Patent: Sep. 8, 1987

[54] METHOD AND A SYSTEM FOR COMPOSING THE PATTERN OF THE CHINESE CHARACTER

[75] Inventor: Chi-Ching Hsu, Taipei, Taiwan

[73] Assignee: Multitech Industrial Corporation, Taipei, Taiwan

[21] Appl. No.: 711,101

[22] Filed: Mar. 13, 1985

[51] Int. Cl.[4] .................... G06F 15/38; G06G 7/60; G09G 1/06; B41J 5/00

[52] U.S. Cl. .................................. 364/419; 340/711; 340/732; 400/110

[58] Field of Search ................ 364/419, 518; 340/711, 340/732, 735, 739; 400/110

[56] References Cited

U.S. PATENT DOCUMENTS

| 4,051,457 | 9/1977 | Inoue et al. | 364/900 X |
| 4,251,871 | 2/1981 | Yu | 400/110 X |
| 4,286,329 | 8/1981 | Goertzal et al. | 178/30 X |
| 4,379,288 | 4/1983 | Leung et al. | 400/110 X |
| 4,490,789 | 12/1984 | Leban et al. | 364/419 |
| 4,511,267 | 4/1985 | Pokorny et al. | 178/30 X |

Primary Examiner—E. A. Goldberg
Assistant Examiner—Patrick W. Foster
Attorney, Agent, or Firm—Burns, Doane, Swecker & Mathis

[57] ABSTRACT

The present invention relates to a method and a system for composing patterns of predetermined less-frequently-used Chinese characters using an information processor, causing the memory occupation to be significantly decreased and the composing speed to be significantly increased and, furthermore, causing the Chinese character to be exactly, ornamentally generated. In accordance with the method and system, a first memory section stores patterns of frequently-used characters and a second memory stores command data. The command data is processed to obtain two patterns from the first memory section, one of the two patterns yielding a first pattern part and the other of the two patterns yielding a second part. The two pattern parts are then used to compose the patterns of less-frequently used Chinese characters.

16 Claims, 7 Drawing Figures

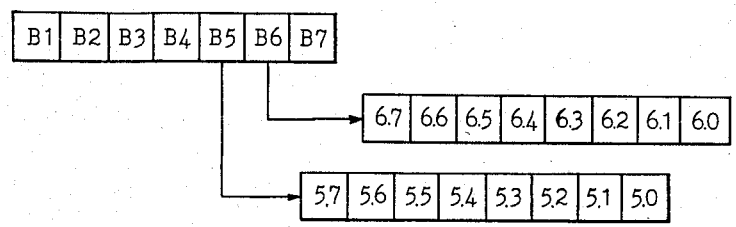
FIG. 1
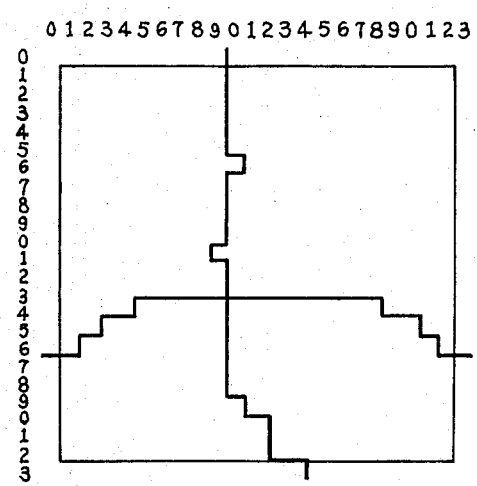
FIG. 2(a)   FIG. 2(b)   FIG. 2(c)
FIG. 3

METHOD AND A SYSTEM FOR COMPOSING THE PATTERN OF THE CHINESE CHARACTER

BACKGROUND OF THE INVENTION

The present invention relates to a Chinese character pattern composing system, and more particularly to a method and a system for composing a plurality of predetermined less-frequently-used Chinese characters using a digital computer system.

Nowadays, the method of managing the patterns of the Chinese characters used in a digital computer system, for the most part, is one of two types:

(a). The first type is generally used in a traditional Chinese computer, in which, all of the Chinese characters are stored in a memory by way of the dot matrix method, in which each dot is represented by one bit of memory. For example, a 24×24 Chinese character pattern must be represented by 72 bytes (3 bytes×24). If there are fifteen thousand characters desired to be stored, 1,080,000 bytes (72 bytes×15,000) of memory are needed. If the memory uses the intergrated circuit designated 27256, which memory capacity is 32K Bytes, thirty four intergrated circuits designated 27256 are needed. Therefore, the storage of the Chinese characters in the traditional Chinese computer occupies a large amount of memory, adding greatly to the cost.

(b). The second type is generally called the graphic type or vector composition type. In such a system, the patterns of the Chinese characters are not stored in the memory, the Chinese characters being plotted by executing a software program according to a plurality of vector data. Hundreds of radicals and thousands of the main bodies of the Chinese characters can be plotted in accordance with the vector data which are designed and stored in the memory beforehand, whereby hundreds of thousands of Chinese characters can be respectively composed by the specific radical and the specific main body. In addition, a plurality of delete commands and composing commands are also utilized to modify the plotted character. Although the graphic type Chinese computer is capable of saving a great deal of memory space, the pattern of the generated character is rough, and the generating procedures are so complicated that the generating speed is low.

The method and a system for composing a plurality of predetermined less-frequently-used Chinese characters according to one preferred embodiment of the present invention is intended to improve on the above-described disadvantages.

SUMMARY OF THE INVENTION

One object of the present invention is to provide a method/system for composing patterns of predetermined less-frequently-used Chinese characters which causes the memory occupation to be significantly decreased and the composing speed to be significantly increased.

Another object of the present invention is to provide a method/system for composing patterns of predetermined less-frequently-used Chinese characters so that the Chinese character can be exactly, ornamentally generated.

In accordance with the present invention, a method for composing a series of requested Chinese characters which are a part of a plurality of predetermined less-frequently-used Chinese characters using a digital computer system comprises the steps of:

(a) storing in a first memory section of the digital computer system a plurality of patterns of predetermined frequently-used Chinese characters;

(b) storing in a second memory section of the digital computer system a plurality of command data for composing the predetermined less-frequently-used Chinese characters;

(c) retrieving one of the command data from the second memory section for one of the requested Chinese characters;

(d) processing the retrieved command data to get two patterns from the first memory section, to obtain two pattern parts, a first and a second pattern part, from the two patterns, and to compose the requested Chinese character by using the two pattern parts; and (e) repeating the steps (c) and (d) until the series of requested Chinese characters is entirely composed.

Furthermore, in accordance with another aspect of the present invention, a system for composing a plurality of predetermined less-frequently-used Chinese characters using an information processor comprises:

means for storing a plurality of patterns of predetermined frequently-used Chinese characters;

means for storing a plurality of command data for composing the less-frequently-used Chinese characters;

means for retrieving one of the command data for a less-frequently-used Chinese character which is requested by the information processor; and means for processing the retrieved command datum to get two patterns from the patterns of the frequently-used Chinese characters, to obtain two pattern parts, a first and a second pattern part, from the two patterns, and to compose the requested less-frequently-used Chinese character by using the two pattern parts.

BRIEF DESCRIPTION OF THE DRAWINGS

The present invention will be more fully understood from the following detailed description, taken in connection with the accompanying drawings which form an integral part of this application and in which:

FIG. 1 is a schematic diagram of the form of a command data in accordance with one preferred embodiment of the present invention;

FIG. 2(a) shows the partial contents of three delete tables in accordance with one preferred embodiment of the present invention;

FIG. 2(b) shows the partial content of a double delete table in accordance with one preferred embodiment of the present invention;

FIG. 2(c) shows the partial content of a trace table in accordance with one preferred embodiment of the present invention;

FIG. 3 is a schematic diagram showing two examples of applying the trace table;

DETAILED DESCRIPTION OF THE PREFERRED EMBODIMENT

Figure 4:
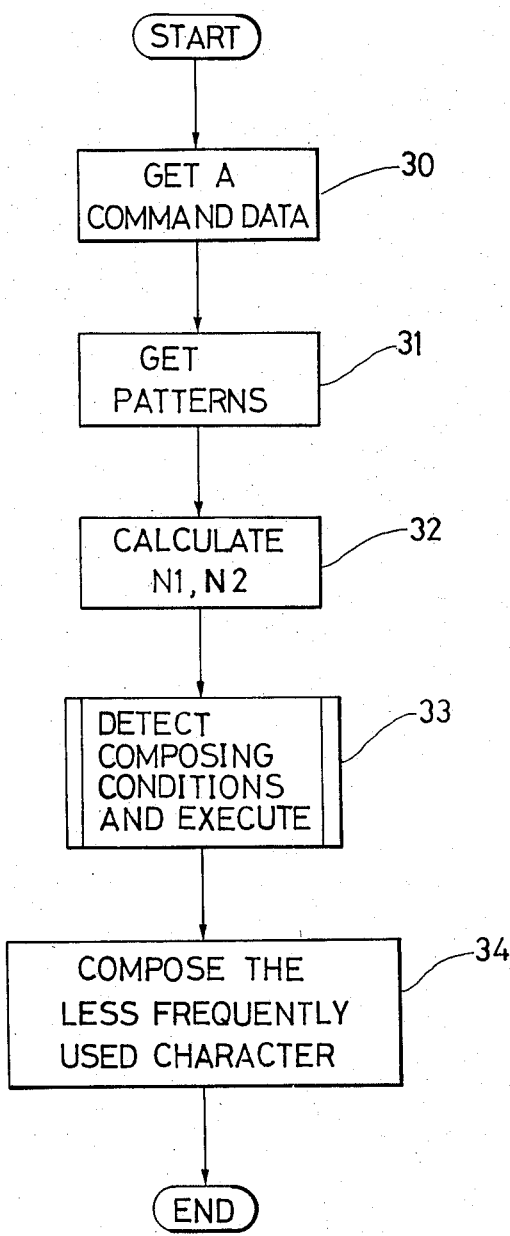
FIG. 4 is a software flowchart showing one way a digital computer system can be programmed to compose a less-frequently-used character.

It has been discovered that improved composing speed, minimized memory occupation, and ornamented character pattern can be achieved by dividing the Chinese character into two kinds, frequently-used characters and less-frequently-used characters, and processing them separately. In the present invention, a plurality of entire patterns of predetermined frequently-used Chinese characters, (for example, 5402 patterns) are stored in a first memory section, and then the patterns of the predetermined less-frequently-used Chinese characters are respectively composed by two pattern parts which are respectively obtained from two selected entire patterns. This function is achieved by executing a software program to process command data stored in a second memory section for less-frequently-used characters. In addition, a plurality of special patterns which cannot be obtained from the patterns of frequently-used characters are also stored in a third memory section for increasing the composing ability. Each command datum, in this embodiment, occupies seven bytes of memory, B1 to B7 as shown in FIG. 1. The memory sections for storing the patterns and the command datas are preferably located in a read only memory (ROM).

Referring now to FIG. 1, the data of the first and second bytes B1 and B2 of a command datum for a less-frequently-used character indicate the address code of an entire pattern or special pattern from which the first pattern part is obtained, and the data of the third and fourth bytes B3 and B4 of the command datum indicate the address code of another entire pattern or special pattern from which the second part is obtained. The fifth and sixth bytes B5 and B6 of the command datum respectively have eight bits which are respectively set to determine the conditions of the composition of the less-frequently-used character, and are designated with reference numbers from bits 5.7 to 5.0 and bits 6.7 to 6.0 as shown in FIG. 1.

Bit 5.7 is used to indicate the composition type, and if bit 5.7 is in a logical low state, for example 0, the first and second pattern parts are composed as the left and right side portions of the less-frequently-used character (called left-right composition type), while if bit 5.7 is in a logical high state, for example 1, the first and second pattern parts are composed as the upper and lower portions of the less-frequently-used character (called upper-lower composition type). Combined bits 5.6 to 5.2 are used to indicate the number N1 of the columns or rows of the first pattern part occupied in the less-frequently-used character. Since in this embodiment the Chinese character is preferably presented as a 24×24 dot matrix mode, five bits ($2^5 = 32$ dots) are enough to indicate the number N1. The number N2 of the columns or rows of the second pattern part occupied in the less-frequently-used character can be obtained by substracting N1 from 24 accordingly. Combined bits 5.1 and 5.0 are used to indicate whether during the composition process applying one of a plurality of application tables is needed. The application tables include three delete tables in which each datum occuppies three bytes, a double delete table in which each datum occupies four bytes, and a trace table in which each datum occupies seven bytes. The delete tables and double delete table are utilized to delete several lines of the retrieved pattern from which the first or second part is obtained. The trace table is utilized to determine how the first or second part is obtained from the retrieved pattern by a trace mode other than a straight line mode. The detailed functions of the application tables will be further described later. When bits 5.1 and 5.0 are all in a logical low state, this indicates that no application table is needed during the composition process. When the bits are all in a logical high state, this indicates that the double delete table is needed. When bit 5.1 is in a logical low state and bit 5.0 is in a logical high state, this indicates that one of the delete tables is needed. When bit 5.1 is in a logical high state and bit 5.0 is in a logical low state, this indicates that the trace table is needed.

Bit 6.7 is used to indicate the selection of the first or second pattern part to be applied to one of the application tables. For example, if bit 6.7 is in a logical low state, this indicates that the application table is applied to the second pattern part, while if bit 6.7 is in a logical high state, this indicates that the application table is applied to the first pattern part. Bit 6.6 is used to indicate the type or mode of application of the application table to the selected pattern part indicated by bit 6.7. If bit 6.6 is in a logical low state, the application table is applied to the selected pattern part in a normal mode, while if bit 6.6 is in a logical high state, the application table is applied to the selected pattern part in an abnormal mode. The normal mode of applying the trace table causes the pattern part to be obtained from the right side or lower portion of the retrieved pattern, while the abnormal mode causes the pattern part to be obtained from the left side or upper portion of the retrieved pattern. The normal mode of applying the delete tables causes the pattern part to be deleted along the vertical line if it is the side portion of the less-frequently-used character, but to be deleted along the horizontal line if it is the upper or lower portion of the less-frequently-used character. The abnormal mode of applying the delete tables causes the pattern part to be deleted along the horizontal line if it is the side portion of the less-frequently-used character, but to be deleted along the vertical line if it is the upper or lower portion of the less-frequently-used character.

Combined bits 6.5 to 6.2 are used to indicate how to obtain the pattern parts from the two retrieved patterns for composing the less-frequently-used character. When bits 6.5 and 6.4 are all in a logical low state, bits 6.3 and 6.2 can represent four conditions. If bits 6.3 and 6.2 are all in a logical low state, the first pattern part is obtained from the left side or upper portion of the retrieved pattern, and the second pattern part is obtained from the right side or lower portion of the other retrieved pattern. If bits 6.3 and 6.2 are all in a logical high state, the first pattern part is obtained from the right side or lower portion of the retrieved pattern, and the second pattern part is obtained from the left side or upper portion of the other retrieved pattern. If bit 6.3 is in a logical low state and bit 6.2 is in a logical high state, the first and second pattern parts are obtained from the left side or upper portion of the two retrieved patterns respectively. If bit 6.3 is in a logical high state and bit 6.2 is in a logical low state, the first and second pattern parts are obtained from the right side or lower portion of the two retrieved patterns respectively. When bits 6.5 and 6.4 are not all in logical low states, combined bits 6.5 to 6.2 can represent sixteen conditions. In this embodiment of the present invention only twelve conditions are utilized to indicate the composition modes using the special patterns, such that in this embodiment of the present invention the first mode uses the special pattern " ", the second mode using one of the special patterns "⊏", "⊢", "⊤", "⊨", and "⊩", etc. In the case of using the special pattern as one pattern part, the other pattern part must have the double delete table applied thereto; thus, bits 5.1 and 5.0 are all in logical high states. In addition, in this embodiment the special pattern occupies the predetermined, fixed columns and rows, and is generally utilized as the first pattern part. Combined bits 6.1 and 6.0 are used to indicate the selection of whichever one of the application tables is to be applied to the selected pattern part indicated by bit 6.7. When bits 6.1 and 6.0 are all in logical low states, the first delete table, the trace table, or the double delete table have the selected pattern part applied thereto. When bit 6.1 is in a logical low state and bit 6.0 is in a logical high state, the second delete table applies. When bit 6.1 is in a logical high state and bit 6.0 in a logical low state, the third delete table applies. When bits 6.1 and 6.0 are all in logical high states, no application table applies to the selected pattern part. Bits 6.1 and 6.0 combined with bits 5.1 and 5.0 can specifically determine which one application table is utilized accordingly. The data of the seventh byte of the command data represents the ordinal number of one piece of data in the above-selected application table. In this embodiment of the present invention, every application table has 256 data labeled ordinal numbers from 00H to FFH ("H" indicates a hexadecimal digit), therefore the data of the seventh byte can be used to select any data from the above-selected application table.

Referring now to FIGS. 2(a) and 2(b), there are shown one example of the delete tables, the double delete table, and the trace table with several data. Since in this embodiment the Chinese character is presented in the 24 columns×24 rows dot matrix mode, each data of the delete tables occupies three bytes, in which a bit in a logical low state indicates the column or row of that bit which should not be deleted, while a bit in a logical high state indicates the column or row of that bit which should be deleted. For example, the data of the 00H ordinal number of the first delete table, D46138H as shown, when converted into a binary digit, is 11010100 01100001 00111000B ("B" indicates a binary digit). Therefore, the columns or the rows 1, 2, 4, 6, 10, 11, 16, 19, 20, and 21 for a dot matrix Chinese character are deleted. Each data of the double delete table occupies four bytes with the first and third bytes respectively indicating one ordinal number of the delete tables, while the second and fourth bytes respectively represent the delete table which the respective ordinal number indicates. The first data represented by the first and second bytes is utilized to delete the columns of the selected pattern part, whereas the second data represented by the third and fourth bytes is utilized to delete the rows of the selected pattern part. For example, the data of the ordinal number 00H of the double delete table, 40006200H as shown in FIG. 2(b), indicates that the ordinal number 40H of the first delete table is used to delete the columns, and the ordinal number 62H of the first delete table is used to delete the rows. The data of the ordinal number 02H of the double delete table, 51015000H as shown in FIG. 2(b), represents the ordinal number 51H of the second delete table that is used to delete the columns, and the ordinal number 50H of the first delete table that is used to delete the rows.

Since the strokes of the Chinese character have many special characteristics, such as "丿", "(", and "、", it is not ideal to divide the frequently-used character into two parts merely along a straight line for obtaining the pattern part. The trace table is advantageously utilized to obtain the pattern part from the pattern of the frequently-used character along a predetermined trace so as to retain the special characteristics, so that in the present invention all composed less-frequently-used Chinese characters can still be presented in beautiful patterns. Each data in the trace table occupies seven bytes as shown in FIG. 2(c), in which the bit in a logical low state indicates the vertical or horizontal dividing action going on one dot without changing direction, while the bit in a logical high state indicates any change of direction in the dividing action. The changed direction is determined by the next bit following the front bit in a logical high state, for example, if the next bit is in a logical low state; the dividing direction turns upwards or to the left side depending upon the horizontal or the vertical dividing action, whereas if the next bit is in a logical high state, the dividing direction turns downwards or to the right side. If it is unnecessary to use all of the bits to determine the dividing action for the pattern part, the unused bits are set in logical low states.

Refering now to FIG. 3, there are shown two examples of applying the trace table, one a vertical dividing action with the data 0341300D9E0000H, and the other a horizontal dividing action with the data 24400066C00000H. The data 0341300D9E0000H, when converted to a binary digit form, is 00000011 01000001 00110000 00001101 10011110 00000000 00000000B, causing the dividing action to be processed along the trace 10 in accordance with the above-described rules. The data 24400066C00000H is in binary digit form 00100100 01000000 00000000 01100110 11000000 00000000 00000000B, causing the dividing action to be processed along the trace 20. It should be noted that the beginning point of the dividing action can be determined by the contents of the fifth and sixth bytes.

For further understanding of the present invention, five composing examples are shown on the next page and described hereinafter.

EXAMPLE 1

The command data of the less-frequently-used character "岺" is 90A59865A00000H, 90A5H is the address code of the pattern of the frequently-used character "岩", and 9865H is the address code of the pattern of the frequently-used character "答" as shown in Example 1. The binary digit converted from the fifth and sixth bytes A000H is 10100000 00000000B, which indicates that the first pattern part is obtained from the upper portion of the "岩", and is to be used as the upper portion of the less-frequently-used character, and that the second pattern part is obtained from the lower portion of the "答", and is to be used as the lower portion of the less-frequently-used character. The row number N1 is 8, and thus the row number N2 is 16. No application table will be utilized during the composition process.

Example 1

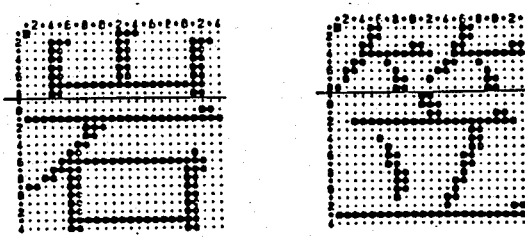

Example 2

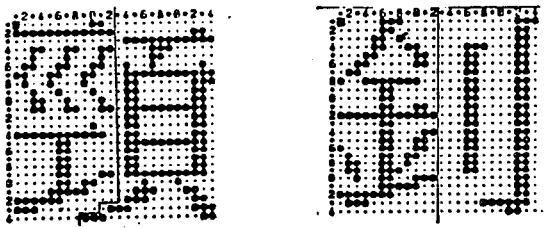

Example 3

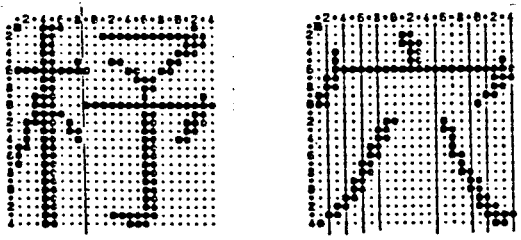

Example 4

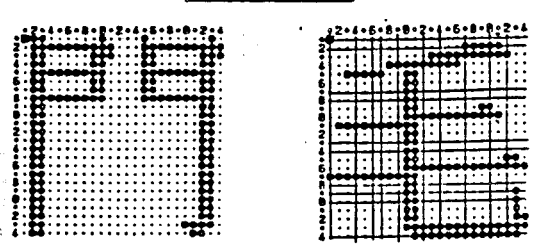

Example 5

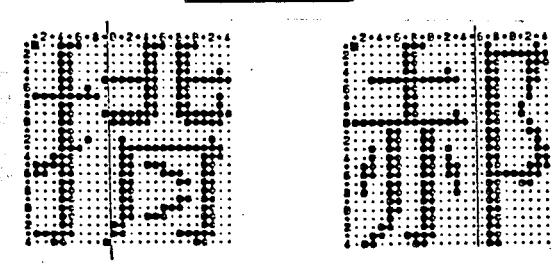

EXAMPLE 2

The command data of the less-frequently-used character "翆" is A39F967C32C04DH, A39FH is the address code of the pattern "翆", and 967CH is the address code of the pattern "釗" as shown in Example 2. The binary digit converted from the fifth and sixth bytes 32C0H is 00110010 11000000B, which indicates that the first pattern part is obtained from the left side portion of the "翆", and is to be used as the left side portion of the less-frequently-used character, and that the second pattern part is obtained from the right side portion of the "釗", and is to be used as the right side portion of the less-frequently-used character. The column number N1 is 12, and thus the column number N2 is 12. The trace table will be used during the composition process, and the data of the ordinal number 4D of the trace table 00000294000000H is utilized to achieve the dividing action along the trace as shown in Example 2. Bit 6.7 indicates the trace table is applied to the pattern from which the first pattern part is obtained, and bit 6.6 indicates that the use of the trace table is abnormal in type, i.e. the first pattern part is by the left side of the trace.

EXAMPLE 3

The command data of the less-frequently-used character "忟" is 91588D9E2100D3H, 9158H is the address code of the pattern "忹", and 8D9EH is the address code of the pattern "穴" as shown in Example 3. The binary digit converted from the fifth and sixth bytes 2100H is 00100001 00000000H which indicates that the first pattern part is obtained from the left side portion of the "忹", and is to be used as the left side portion of the less-frequently-used character, and that the second pattern part is the entire pattern of the "穴", and is to be used as the right side portion of the less-frequently-used character. The column number N1 is 8, and thus the column number N2 is 16. The first delete table will be used during the composition process, and the data of the ordinal number D3 of the first delete table 550229H is utilized to achieve the delete function as shown in Example 3. Bit 6.7 indicates that the delete table is applied to the pattern from which the second pattern part is obtained, and bit 6.6 indicates that the use of the delete table is normal in type.

EXAMPLE 4

The command data of the less-frequently-used character "閐" is 02258CD1A33465H, 0225H is the address code of the special pattern "毛", and 8CD1H is the address code of the pattern "手" as shown in Example 4. The binary digit converted from the fifth and sixth bytes A334H is 10100011 00110100H. The first pattern part is the special pattern "毛" which is predetermined to occupy eight columns and ten rows of the less-frequently-used character as shown in Example 4, and the second pattern part is the entire pattern of the "門", and is to be used as the lower portion of the less-frequently-used character. The row number N1 is 8, and thus the row number N2 is 16. The double delete table will be used during the composition process, and the data of the ordinal number 65H of the double delete table is utilized to achieve the delete function as shown in Example 4. Bit 6.7 indicates the double delete table is applied to the pattern from which the second pattern part is obtained.

EXAMPLE 5

The command data of the less-frequently-used character "郜" is 99D196753C0800H, 99D1H is the address code of the pattern "指", and 9675H is the address code of the address code of the pattern "郝" as shown in Example 5. The binary digit converted from the fifth and sixth bytes 3C08H is 00111100 00001000B, which indicates that the first pattern part is obtained from the right side portion of the "指", and is to be used as the left side portion of the less-frequently-used character, and that the second pattern part is obtained from the right side portion "郝", and is to be used as the right side portion of the less-frequently-used character. The column number N1 is 15, and thus the column number N2 is 9. No application table will be utilized during the composition process.

Figure 5:
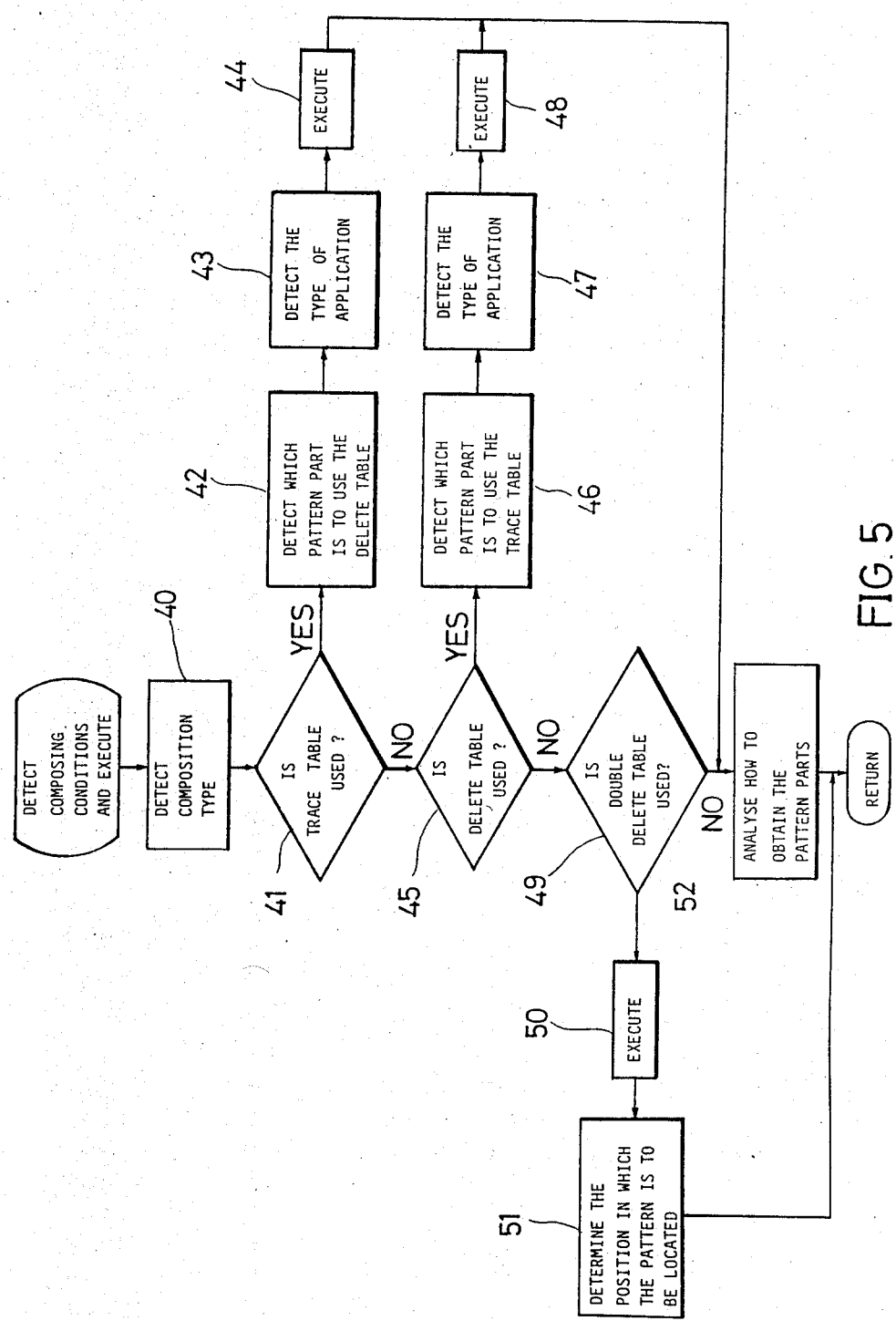
FIG. 5 is a software flowchart showing one way a digital computer system can be programmed to achieve a "detect composing conditions and execute" sub-process.

FIGS. 4 and 5 are flowcharts of one preferred embodiment of the processing command data program stored in the memory of the digital computer system. In FIG. 4, when a less-frequently-used Chinese character is requested, the processing command data program is triggered. First, the command data of the requested less-frequently-used character is received at step 30, and at step 31 the two patterns for composing the less-frequently-used character are received in accordance with the address codes indicated in the first to fourth bytes of the command data. Then the numbers N1 and N2 are calculated at step 32, and each part of the character's composition is detected and executed to obtain the two pattern parts in the "detect composing conditions and execute" sub-process at step 33 according to the remaining bytes of the command data. At step 34 two obtained pattern parts are composed to form the less-frequently-used Chinese character.

In the "detect composing conditions and execute" flowchart of FIG. 5, at step 40 the composition type, upper-lower composition or left-right composition, is detected. A check is made at step 41 to determine whether the trace table is used, and if the logic decision is false, then another check is made at step 45 to determine whether the delete table is used. If the trace table or the delete table is used, the pattern part to which the respective application table is to be applied type of application, normal type or abnormal type, to be used, are respectively detected at steps 42 or 46, and 43 or 47, and then the application table process is executed at step 44 or 48. If the logic decisions of the above checks (steps 41 and 45) are all false, a check is further made at step 49 to determine whether the double delete table is used. If the double delete table is used; since, in this embodiment, the need to use the double delete table only occurs when one special pattern is being utilized to compose a less-frequently-used character, the double delete table can be directly executed at step 50. Then, at step 51, a determination is made to place the pattern in an area which is not already occupied by the predetermined special pattern. If the double delete table is not used, the analysis of how to obtain the pattern parts from the two patterns is made at step 52. When the "detect composing conditions and execute" sub-process terminates, the program is returned to the beginning of step 34 in FIG. 4.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures.

What I claim is:

1. A method for composing a series of requested Chinese characters which are a part of a plurality of predetermined less-frequently-used Chinese characters using a digital computer system, said method comprising the steps of:
    (a) a storing in a first memory section of said digital computer system a plurality of entire patterns of predetermined frequently-used Chinese characters;
    (b) storing in a second memory section of said digital computer system command data for composing said predetermined less-frequently-used Chinese characters;
    (c) retrieving a datum of said command data from said second memory section for one of said requested Chinese characters;
    (d) processing said retrieved command datum to obtain two selected entire patterns from said first memory section, to obtain two pattern parts, a first pattern part and a second pattern part, from said two selected entire patterns, and to compose said requested Chinese character by using said two pattern parts; and
    (e) repeating said steps (c) and (d) until said series of requested Chinese characters is entirely composed.

2. The method as claimed in claim 1, wherein said step (a) further comprises the step of storing in a third memory section of said digital computer system a plurality of predetermined special patterns.

3. The method as claimed in claim 2, wherein each of said command data occupies seven bytes with the data of the first to fourth bytes of each command data containing the address codes of said two patterns, and the fifth byte of each command data having eight bits which are respectively set to determine the conditions of the composition as follows:
    bit 7 indicates a composition type; bits 6 to 2 indicate a number of a column or row occupied by said first pattern part, and bits 1 and 0 indicate whether it is necessary to use one of a plurality of application tables during the composition process.

4. The method as claimed in claim 3, wherein the sixth byte of each command datum has eight bits which are respectively set to determine the conditions of the composition as follows:
    bit 7 indicates the selection of one pattern part from said first pattern part and said second pattern part to which one of said application tables is to be applied; bit 6 indicates a type of application of said application table to said selected one pattern part indicated by bit 7; bits 5 to 2 indicate how to obtain said two pattern parts from said two patterns for composing said requested character; and bits 1 and 0 indicate selection of one of said application tables for application to said selected pattern part indicated by bit 7.

5. The method as claimed in claim 4, wherein the data of the seventh byte of each command datarepresents an ordinal number of one piece of data in said selected one of said application tables.

6. The method as claimed in claim 5, wherein said plurality of application tables includes three delete tables having delete data in which each delete datum occupies three bytes, a double delete table having double delete data in which each double delete datum occupies four bytes, and a trace table having trace data in which each trace datum occupies seven bytes.

7. The method as claimed in claim 6, wherein said first, second and third memory sections are located in a read only memory.

8. The method as claimed in claim 5, wherein said step (d) comprises the steps of:
    (f) obtaining said two patterns in accordance with said first to fourth bytes of said command data;
    (g) calculating respective numbers of the column or row that said first and second pattern parts occupy;
    (h) detecting the conditions of the composition in accordance with said fifth and sixth bytes of said sommand data; and
    (i) after said step (h), executing said selected one of said application tables for obtaining said two pattern parts according to one datum of said application table having an ordinal number which is indicated in said seventh byte.

9. A system for composing a plurality of predetermined less-frequently-used Chinese characters using an information processor, said system comprising:

first storage means for storing a plurality of entire patterns of predetermined frequently-used Chinese characters;

second storage means for storing a plurality of command data for composing said predetermined less-frequently-used Chinese characters;

retrieving means for retrieving one of said command data for a less-frequently-used Chinese character which is requested by said information processor; and processing means for processing said retrieved command data to obtain two selected entire patterns from said plurality of patterns of said frequently-used Chinese characters, to obtain two pattern parts, a first and a second pattern part, from said obtained two selected entire patterns, and to compose said requested less-frequently-used Chinese character by using said two pattern parts.

10. The system as claimed in claim 9, wherein said first storage means for storing a plurality of patterns of predetermined frequently-used Chinese characters stores a plurality of predetermined special patterns.

11. The system as claimed in claim 10, wherein each of said command data occupies a plurality of bytes, said plurality of bytes including first to fourth bytes established as the address codes of said obtained two patterns, and a fifth byte having eight bits respectively set to determine conditions of the composition as follows:

bit 7 indicates a composition type; bits 6 to 2 indicate a number of a column or row occupied by said first pattern part; and bits 1 and 0 indicate whether it is necessary to use one of a plurality of application tables during the composition.

12. The system as claimed in claim 11, wherein the plurality of bytes includes a sixth byte having eights bits respectively set to determined the conditions of the composition as follows:

bit 7 indicates the selection of one pattern part, from said first and second pattern parts, to which one of said application tables is applied; bit 6 indicates the type of application of said application table to said selected one pattern part indicated by bit 7; bits 5 to 2 indicate how to obtain said pattern parts from said two patterns for composing said requested less-frequently-used character; and bits 1 and 0 indicate the selection of one of said application tables for application to said selected one pattern part indicated by bit 7.

13. The system as claimed in claim 12, wherein the plurality of bytes includes a seventh byte which represents an ordinal number of one piece of data in said selected application tables.

14. The system as claimed in claim 13, wherein said plurality of application tables includes three delete tables, each having data of four bytes each, a double delete table having data of four bytes each, and a trace table having data of seven bytes each.

15. The system as claimed in claim 14, wherein said first, second and third memory sections are located in a read only memory.

16. The system as claimed in claim 13, wherein said processing means for processing said command data comprises:

means for obtaining said patterns in accordance with said first to fourth bytes of said command data;

means for calculating the respective numbers of the column or row that said first and second pattern parts occupy;

means for detecting the conditions of composition in accordance with said fifth and sixth bytes of said command data;

means for executing said selected one of said application tables for obtaining said two pattern parts according to said one piece of data, in said selected one of said application tables, having its ordinal number indicated in said seventh byte; and means for composing said requested less-frequently-used Chinese character by means of said two pattern parts.

* * * * *